(12) United States Patent
Koseki

(10) Patent No.: US 8,489,813 B2
(45) Date of Patent: *Jul. 16, 2013

(54) STORAGE SYSTEM THAT EXECUTES PERFORMANCE OPTIMIZATION THAT MAINTAINS REDUNDANCY

(75) Inventor: Hideyuki Koseki, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,643

(22) Filed: Jul. 3, 2012

(65) Prior Publication Data

US 2012/0271992 A1 Oct. 25, 2012

Related U.S. Application Data

(63) Continuation of application No. 13/082,872, filed on Apr. 8, 2011, now Pat. No. 8,239,626, which is a continuation of application No. 11/969,315, filed on Jan. 4, 2008, now Pat. No. 7,945,732.

(30) Foreign Application Priority Data

Jun. 15, 2007 (JP) ................................. 2007-159303

(51) Int. Cl.
- *G06F 12/00* (2006.01)
- *G06F 13/00* (2006.01)
- *G06F 13/28* (2006.01)

(52) U.S. Cl.
USPC .................... 711/114; 711/103; 711/E12.008

(58) Field of Classification Search
USPC .................................. 711/103, E12.008, 114
See application file for complete search history.

(56) References Cited

U.S. PATENT DOCUMENTS

| 7,636,801 | B1 | 12/2009 | Kekre et al. | |
|---|---|---|---|---|
| 7,945,732 | B2 * | 5/2011 | Koseki | 711/114 |
| 8,239,626 | B2 * | 8/2012 | Koseki | 711/114 |
| 2004/0177218 | A1 | 9/2004 | Meehan et al. | |
| 2005/0055603 | A1 | 3/2005 | Soran et al. | |
| 2006/0031268 | A1 | 2/2006 | Shutt et al. | |
| 2006/0031644 | A1 | 2/2006 | Hughes | |
| 2006/0031648 | A1 | 2/2006 | Ishikawa et al. | |
| 2006/0077724 | A1 | 4/2006 | Chikusa et al. | |
| 2007/0192382 | A1 | 8/2007 | Harris | |
| 2008/0313398 | A1 | 12/2008 | Koseki | |
| 2009/0319749 | A1 | 12/2009 | Ogihara et al. | |
| 2011/0185124 | A1 | 7/2011 | Koseki | |

FOREIGN PATENT DOCUMENTS

| JP | 07056691 | 3/1995 |
|---|---|---|
| JP | 200653601 | 2/2006 |

* cited by examiner

*Primary Examiner* — Sheng-Jen Tsai
(74) *Attorney, Agent, or Firm* — Brundidge & Stanger, P.C.

(57) ABSTRACT

One storage area is selected from two or more storage areas of a high load physical storage device, a physical storage device with a lower load than that of the physical storage device is selected, and it is judged whether the redundancy according to the RAID level corresponding to the logical volume decreases when the data elements stored in the selected storage area are transferred to the selected low load physical storage device. If the result of this judgment is that the redundancy does not decrease, the data elements stored in the selected storage area are transferred to a buffer area of the selected low load physical storage device and the logical address space of the logical volume that corresponds to the selected storage area is associated with the buffer area.

20 Claims, 15 Drawing Sheets

FIG. 4

| | | LOGICAL ADDRESS | | PHYSICAL ADDRESS | | | | | |
|---|---|---|---|---|---|---|---|---|---|
| | | | | USER DATA SEARCH | | REDUNDANT DATA SEARCH 1 | | REDUNDANT DATA SEARCH 2 | |
| STRIPE No | RAID LEVEL | LEADING LBA | END LBA | HDD No | Zone No | HDD No | Zone No | HDD No | ZONE No |
| 0 | 5 | 0 | 129024 | 1-0 | 0 | 1-2 | 0 | N/A | N/A |
| 1 | | 129025 | 260096 | 1-1 | 0 | 1-1 | 1 | N/A | N/A |
| 2 | | 260097 | 391168 | 1-0 | 1 | 1-0 | 2 | N/A | N/A |
| 3 | | 391169 | 522240 | 1-2 | 1 | 1-2 | 3 | N/A | N/A |
| 4 | | 522241 | 653312 | 1-1 | 2 | 1-1 | 4 | N/A | N/A |
| 5 | | 653313 | 784384 | 1-2 | 2 | 1-0 | 5 | N/A | N/A |
| 6 | | 784385 | 915456 | 1-0 | 3 | 1-2 | 6 | N/A | N/A |
| 7 | | 915457 | 1046528 | 1-1 | 3 | 1-1 | 7 | N/A | N/A |
| | | 1046529 | 1177600 | 1-0 | 4 | | | | |
| | | 1177601 | 1308672 | 1-2 | 4 | | | | |
| | | 1308673 | 1439744 | 1-1 | 5 | | | | |
| | | 1439745 | 1570816 | 1-2 | 5 | | | | |
| | | 1570817 | 1701888 | 1-0 | 6 | | | | |
| | | 1701889 | 1832960 | 1-1 | 6 | | | | |
| | | 1832961 | 1964032 | 1-0 | 7 | | | | |
| | | 1964033 | 2095104 | 1-2 | 7 | | | | |
| ... | ... | ... | ... | ... | ... | ... | ... | ... | ... |

FIG. 5

| ZONE No 1321 | ATTRIBUTE 1322 | LU No 1323 | LOGICAL ADDRESS 1324 | | PHYSICAL ADDRESS 1325 | | OPTIMAL POSITION 1326 |
|---|---|---|---|---|---|---|---|
| | | | START LBA 13241 | END LBA 13242 | START LBA 13251 | END LBA 13252 | |
| 0 | D | 1 | 790080 | 790208 | 1501184 | 1501312 | 4 |
| 1 | D | 1 | 790592 | 790720 | 1501696 | 1501824 | 24 |
| 2 | D | 1 | 791104 | 791232 | 1502208 | 1502336 | 0 |
| 3 | D | 2 | 0 | 128 | 1502720 | 1502848 | 10 |
| | D | 2 | 512 | 640 | 1503232 | 1503360 | 16 |
| ... | ... | ... | ... | ... | ... | ... | ... |
| N | SWAP | N/A | N/A | N/A | 1665024 | 1665152 | N/A |

| ZONE No (1331) | NUMBER OF COMMANDS (1332) | LOAD RANKING (1333) |
|---|---|---|
| 0 | 12340 | 4 |
| 1 | 123 | 24 |
| 2 | 23456 | 0 |
| ⋮ | ⋮ | ⋮ |
| N | N/A | N/A |

| DISK No (1341) | LOAD RATIO (1342) |
|---|---|
| 0 | 60% |
| 1 | 95% |
| 2 | 40% |
| 3 | 65% |
| ⋮ | ⋮ |

STORAGE SYSTEM THAT EXECUTES PERFORMANCE OPTIMIZATION THAT MAINTAINS REDUNDANCY

CROSS-REFERENCE TO PRIOR APPLICATIONS

The present application is a continuation of application Ser. No. 13/082,872, filed Apr. 8, 2011, now U.S. Pat. No. 8,239,626; which is a continuation of application Ser. No. 11/969,315, filed Jan. 4, 2008, now U.S. Pat. No. 7,945,732; which relates to and claims the benefit of priority from Japanese Patent Application number 2007-159303, filed on Jun. 15, 2007, the entire disclosures of which are incorporated herein by reference.

BACKGROUND OF THE INVENTION

The present invention generally relates to the optimization of the performance of a storage system.

As a technology for distributing the load of a storage device, the technology disclosed in Japanese Application Laid Open Nos. H7-56691 and 2006-53601, for example, are known. Japanese Application Laid Open No. H7-56691 discloses a load distribution technology for a plurality of disk devices that constitute a striping disk. Japanese Application Laid Open No. 2006-53601 discloses a load distribution technology of a logical storage device (logical volume).

Normally, a storage system performs storage control, which utilizes RAID (Redundant Array of Independent (or Inexpensive) Disks) technology. More specifically, for example, a storage system comprises a RAID group that is constituted by two or more physical storage devices (also known as a 'parity group' or an 'array group') and storage control that is adapted to the RAID level of the RAID group is carried out.

RAID levels that are generally adopted include RAID levels which, even when a fault occurs in one of the two or more physical storage devices constituting the RAID group, allow data elements stored in a physical storage device in which a fault occurs to be recovered ('recoverable' RAID level hereinbelow) and, more specifically, RAID levels other than RAID0 (RAID1, RAID5, or RAID6, for example).

The physical storage device comprises a plurality of physical storage areas. The loads of two or more physical storage devices that constitute the same RAID group are sometimes subject to scattering due to the access pattern. Hence, the distribution of the load of the physical storage device and, more specifically, the re-arrangement of the data elements in physical storage area units is thought to be desirable.

Further, each time such load distribution is performed, redundancy must be maintained in cases where a recoverable RAID level is adopted. However, according to Japanese Application Laid Open No. H7-56691, because of the load distribution of a plurality of disk devices constituting a striping disk, in other words, the load distribution in cases where the RAID level is RAID0, load distribution that considers redundancy is not carried out. In addition, according to the technology disclosed in Japanese Application Laid Open No. 2006-53601, the load of the logical storage devices (logical volumes) rather than the load of the physical storage devices is distributed.

SUMMARY OF THE INVENTION

Therefore, an object of the present invention is to distribute the load of the physical storage devices while maintaining the redundancy of the storage system.

Further objects of the present invention will become clear from the subsequent description.

One storage area is selected from two or more storage areas of a high load physical storage device, a physical storage device with a lower load than that of the physical storage device is selected, and it is judged whether the redundancy according to the RAID level corresponding to the logical volume decreases when the data elements stored in the selected storage area are transferred to the selected low load physical storage device. If the result of this judgment is that the redundancy does not decrease, the data elements stored in the selected storage area are transferred to a buffer area of the selected low load physical storage device, and a logical address space of the logical volume that corresponds to the selected storage area is associated with the buffer area.

BRIEF DESCRIPTION OF THE DRAWINGS

FIG. 4 is a constitutional example of an LU management table;

FIG. 5 shows a constitutional example of a zone management table;

FIG. 6 shows a constitutional example of a zone load management table;

FIG. 7 shows a constitutional example of a disk load management table;

DETAILED DESCRIPTION OF THE PREFERRED EMBODIMENTS

Figure 1:
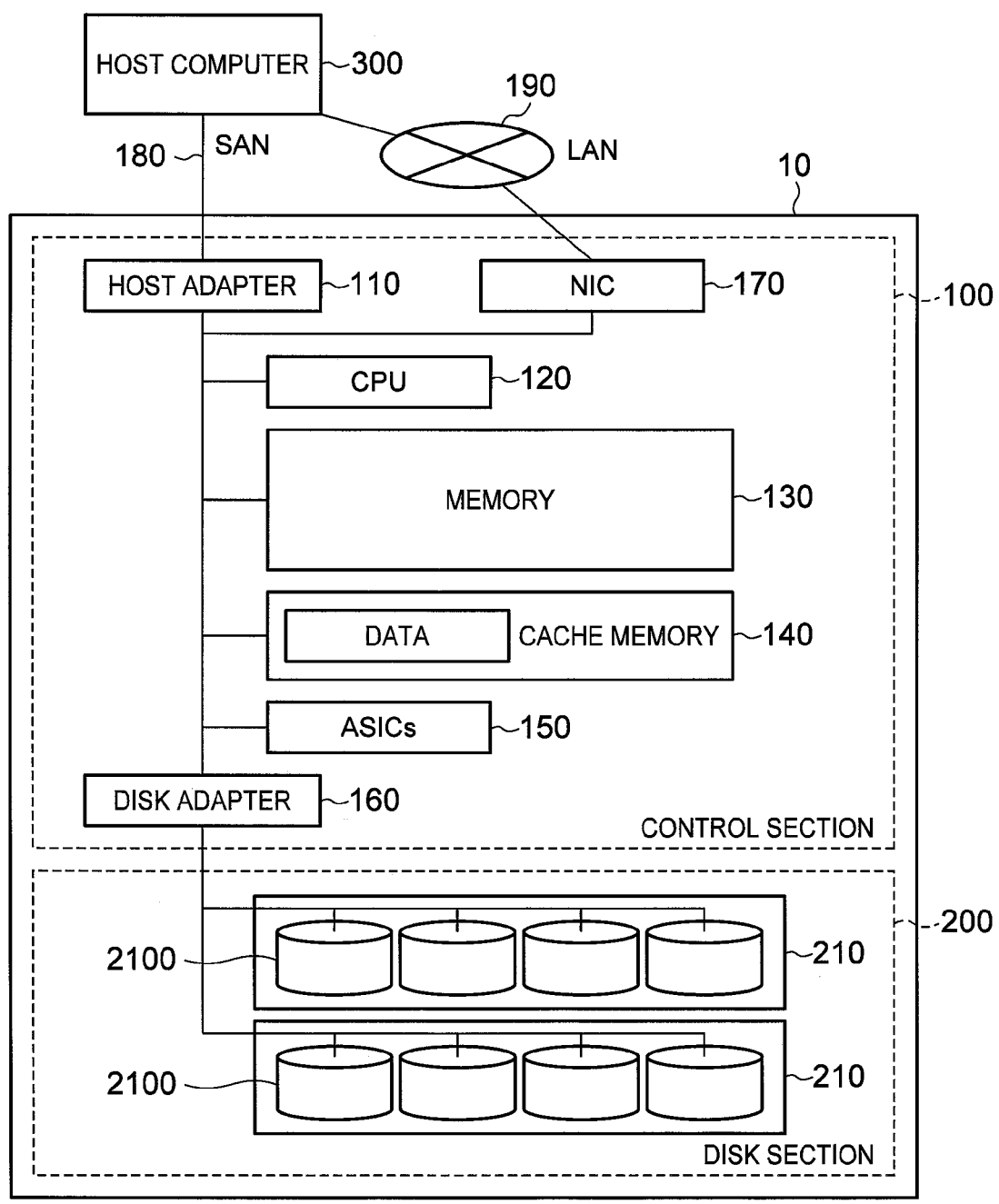
FIG. 1 shows an overall constitutional example of a computer system of an embodiment of the present invention.

According to a first embodiment, in a storage system, access based on a RAID level corresponding to the logical volume is made by an access module to respective storage areas of each of the two or more physical storage devices constituting an access destination logical volume and the storage system comprises a load calculation module that calculates the load of each of the physical storage devices based on a load that accompanies the access to each storage area;

and a load distribution processing module that executes load distribution processing to distribute the loads of the plurality of physical storage devices. The load distribution processing module comprises a judgment module and data re-arrangement module. In the load distribution processing, the judgment module selects one storage area from two or more storage areas of a high load physical storage device, selects a physical storage device with a lower load than that of the physical storage device, and judges whether the redundancy according to the RAID level (the RAID level corresponding to the logical volume in which the data elements are stored) decreases when the data elements stored in the selected storage area are transferred to the selected low load physical storage device. If the result of this judgment is that the redundancy does not decrease, in the load distribution processing, the data re-arrangement module transfers the data elements stored in the selected storage area to a buffer area of the selected low load physical storage device (a storage area used as a buffer that does not correspond to a logical address space of the logical volume) and associates the logical address space of the logical volume that corresponds to the selected storage area with the buffer area.

According to a second embodiment, in the first embodiment, the storage system further comprises volume management information representing which storage area of which physical storage device each of the plurality of data elements written to volume element areas constituting the logical volume is written to. This information is stored in a storage area in the storage system, for example. The judgment of whether the redundancy decreases is a judgment that is performed by referencing the volume management information and is a judgment of whether the physical storage device having the selected storage area is the selected low load physical storage device, for the same volume element area.

According to a third embodiment, in at least one of the first and second embodiments, after data elements have been transferred from the selected storage area by the data re-arrangement module, the storage area is established as the buffer area. More specifically, for example, an address space representing an invalid (value) is associated as the logical address space associated with the storage area or a value representing the buffer area is associated with the storage area as information representing the attribute of the storage area.

According to a fourth embodiment, in at least one of the first to third embodiments, in cases where the judgment result is that the redundancy decreases, the judgment module selects a physical storage device which has a lower load than that of the high load physical storage device and has a higher load than the physical storage device that is selected in the previous judgment. A judgment of whether the redundancy decreases can be performed once again for the selected physical storage device.

According to a fifth embodiment, in at least one of the first to fourth embodiments, in cases where the high load physical storage device is a physical storage device with the Kth (K is an integer) highest load among the plurality of physical storage devices, the low load physical storage device that is initially selected is the physical storage device with the Kth lowest load among the plurality of physical storage devices.

According to a sixth embodiment, in at least one of the first to fifth embodiments, the judgment module also judges, based on the load of the selected storage area, whether the load of the selected low load physical storage device exceeds a predetermined value in cases where the data elements are transferred, and if the load exceeds the predetermined value, selects a storage area with a lower load than that of the previously selected storage area, from the two or more storage areas of the high load physical storage device.

According to a seventh embodiment, in at least one of the first to sixth embodiments, the data re-arrangement module transfers data elements that are stored in a storage area selected from two or more storage areas of the low load physical storage device to the buffer area of the high load physical storage device. That is, data elements stored in the first storage area selected from the high load physical storage device are copied to a buffer area in the low load physical storage device and data elements stored in the second storage area selected from the high load physical storage device are copied to a buffer area of the high load physical storage device.

According to an eighth embodiment, in the seventh embodiment, the judgment module also judges whether the load of the second storage area is higher than the load of the first storage area selected from the high load physical storage device, and if the former is higher than the latter, selects a physical storage device which has a lower load than the high load physical storage device and which is other than the low load physical storage device.

According to a ninth embodiment, in at least one of the first to eighth embodiments, the storage system further comprises a storage device optimization module that executes storage device optimization processing for a certain physical storage device among the plurality of physical storage devices. In the storage device optimization processing, for the certain physical storage device, data elements stored in a first storage area with high-speed access and a low load are copied to a buffer area of the certain physical storage device, and data elements stored in a second storage area with lower-speed access than the first storage area and with a high load are copied to the first storage area, and the logical address space associated with the second storage area is associated with the first storage area while the logical address space associated with the first storage area is associated with the buffer area.

According to a tenth embodiment, in the ninth embodiment, the storage device optimization processing is executed after the load distribution processing.

According to an eleventh embodiment, in at least one of the ninth and tenth embodiments, in the storage device optimization processing, data elements stored in the second storage area are also copied to the first storage area, whereupon the second storage area is established as a buffer area.

According to a twelfth embodiment, in at least one of the ninth to eleventh embodiments, the certain physical storage device is a disk-medium drive. The first storage area is a storage area that exists closer to the outer periphery of the disk medium than the second storage area.

According to a thirteenth embodiment, in at least one of the ninth to twelfth embodiments, the storage system further comprises: a dispersion extent judgment module that judges whether the dispersion extent of the load of the plurality of physical storage devices is equal to or less than a predetermined extent. When it is judged that the dispersion extent of the load is equal to or less than the predetermined extent, the storage device optimization processing is performed without performing the load distribution processing.

According to a fourteenth embodiment, in at least one of the ninth to thirteenth embodiments, the certain physical storage device has two or more buffer areas. The storage device optimization module is able to perform storage device optimization processing by using the two or more buffer areas in parallel for two or more first storage devices of the certain physical storage device.

According to a fifteenth embodiment, in at least one of the ninth to fourteenth embodiments, respective storage area identifiers of two or more storage areas of the certain physical storage device are serial numbers. In cases where the load rankings of the respective storage areas are set as storage area identifiers, the copy destination of the data elements stored in the respective storage areas is a storage area that is identified from the storage area identifiers.

Two or more embodiments of the plurality of above embodiments can be combined. Further, the respective modules (the judgment module, data re-arrangement module, storage device performance optimization module, for example) can be constructed by hardware, a computer program or a combination thereof (some of the parts are implemented by a computer program while the remainder are implemented by hardware, for example). The computer program is read to a predetermined processor and executed. Further, in the event of information processing, in which the computer program is read to the processor and executed, a storage area that exists on hardware resources such as memory may be used. In addition, the computer program may be installed on the computer from a recording medium such as a CD-ROM or may be downloaded to the computer via a communication network.

An embodiment of the present invention will be described hereinbelow in detail with reference to the drawings.

FIG. 1 shows an overall constitutional example of the computer system according to an embodiment of the present invention.

In FIG. 1, a storage system 10 is constituted by a control section 100 that performs control of the whole storage system 10 and a disk section 200 in which data are stored.

A host computer (a higher level device (application server, for example) that utilizes the storage system 10) 300 is connected to the storage system 10 via a host adapter 110 of the control section 100. The interface for connecting the host computer 300 to the storage system 10 uses a SAN (Storage Area Network) 180, for example. In the architecture of the SAN 180, for example, a fiber channel, SCSI (Small Computer System Interface), iSCSI (internet Small Computer System Interface), USB (Universal Serial Bus), IEEE1394 bus or the like can be used. In addition, there may also be a plurality of the host computer 300 connected to the storage system 10. Furthermore, another type of interface may also be adopted instead of the SAN 180.

The host computer 300 has control software for controlling the operation of the storage system 10 installed thereon and, using control software that is executed by the host computer 300, commands and so forth can be issued to the storage system 10 to control the operation of the storage system 10. However, the control software that is executed by the storage system 10 and host computer 300 is distributed via a LAN (Local Area Network) 190, for example. With regard to the computer for performing management, control or maintenance of the storage system 10, a computer other than the host computer 300 may also be used. In addition, another type of communication network may also be utilized instead of the LAN 190.

The control section 100 comprises a host adapter 110 to which the host computer 300 is connected and which communicates with the host computer 300, a CPU (Central Processing Unit) 120 that performs overall control of the storage system 10, and a memory 130 on which a computer program and data and so forth that are required for the CPU 120 to control the storage system 10 are stored. In addition, the control section 100 comprises a cache memory 140 in which data that are communicated between the host computer 300 and disk section 200 are temporarily stored, an ASICs (application specific integrated circuits) 150 which compute parity data, and a disk adapter 160 that is connected to the respective physical disks 2100 constituting the disk section 200 and which communicates with the respective physical disks 2100.

The disk section 200 comprises a plurality of disk boxes 210 and comprises a plurality of physical disks 2100 in the respective disk boxes 210. A RAID group is constituted by two or more physical disks 2100 among the plurality of physical disks 2100. The physical disk 2100 is a hard disk drive (HDD), for example, but may also be another type of physical disk drive such as a DVD (Digital Versatile Disk) drive, for example. In addition, another type of physical storage device such as a semiconductor memory drive (a flash memory drive, for example) may be adopted in place of the physical disk drive.

Figure 2:
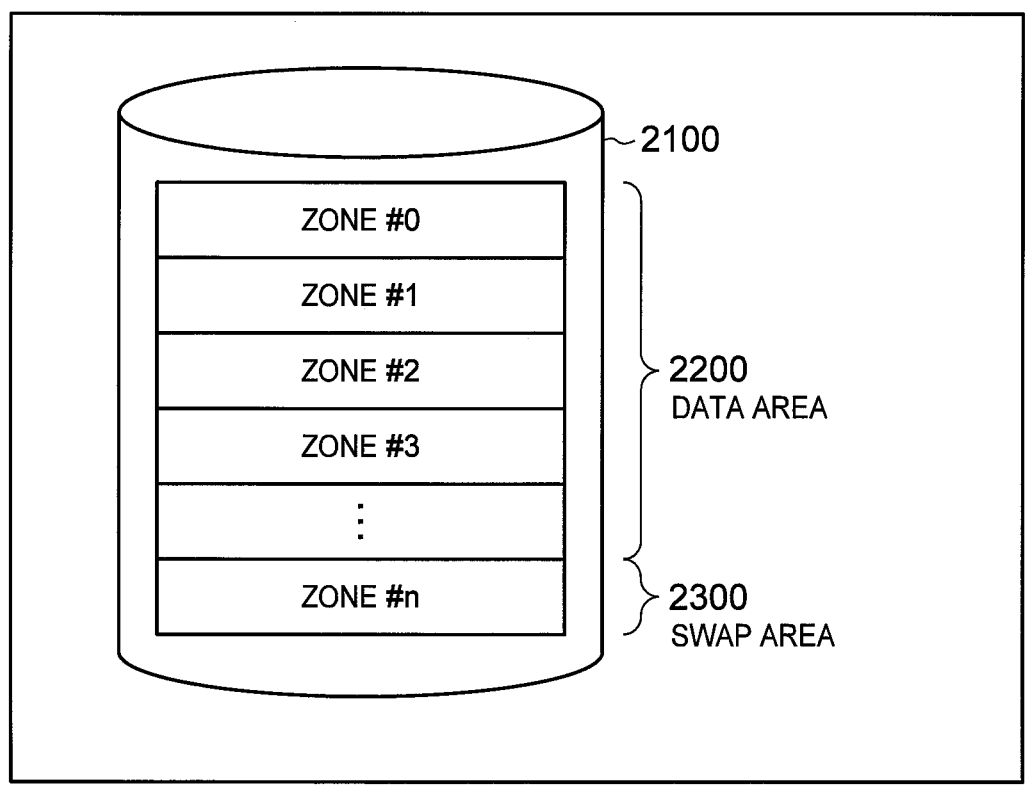
FIG. 2 shows a constitutional example of a storage space provided by a physical disk.
Figure 16:
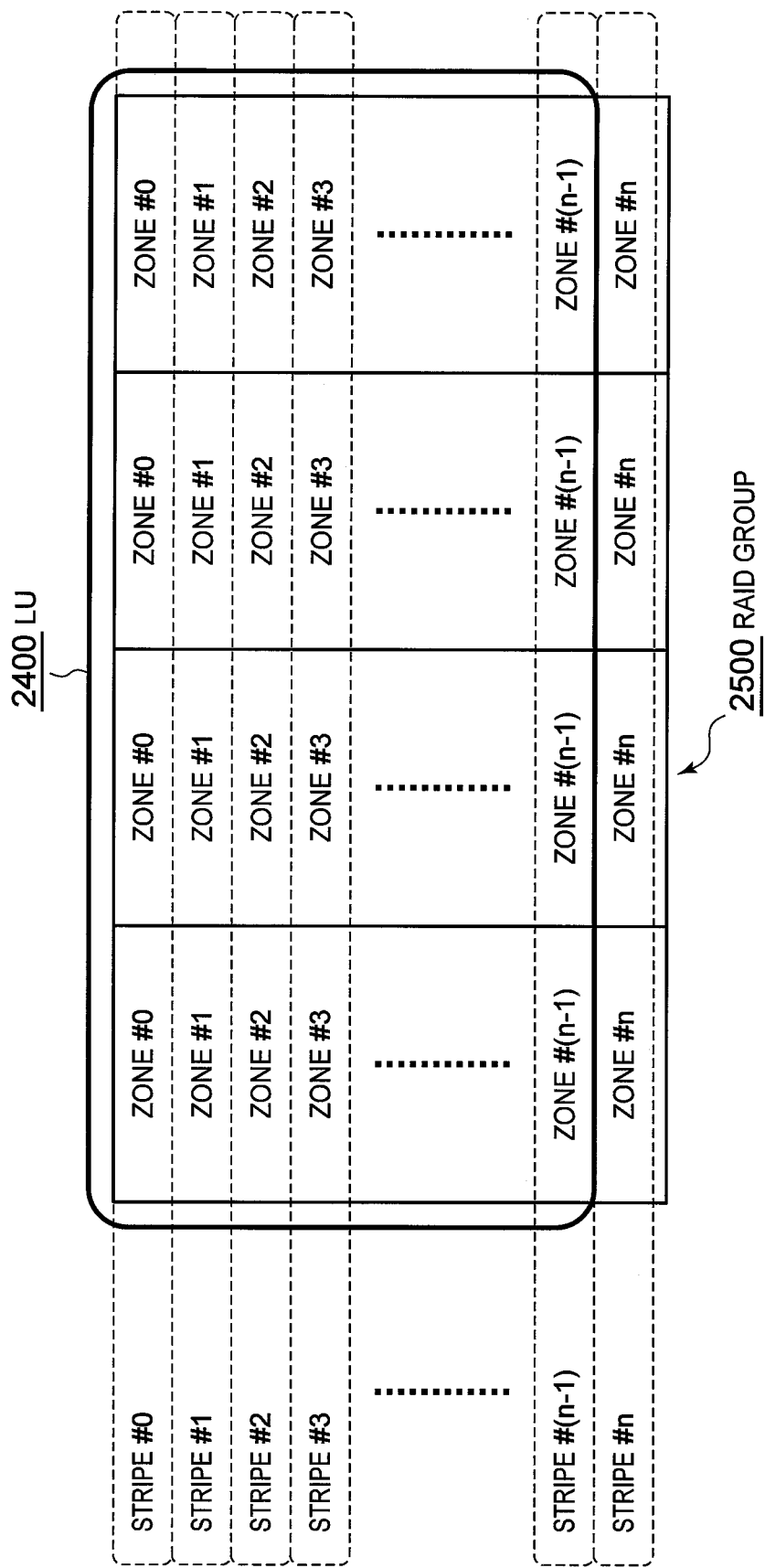
FIG. 16 shows a constitutional example of a storage space provided by a RAID group.

FIG. 2 shows a constitutional example of the storage space provided by the physical disk 2100. FIG. 16 shows a constitutional example of the storage space provided by the RAID group.

As shown in FIG. 16, based on the storage space provided by the RAID group 2500, one or more logical storage devices (called LU (Logical Units) hereinbelow) is formed. One LU is constituted by a part of a storage space of the respective physical disks 2100 constituting the RAID group. The LU is constituted by a plurality of storage areas of a predetermined size. The storage area of a predetermined size is expediently known as a 'stripe'.

As shown in FIG. 2, the storage area provided by the physical disk 2100 is constituted by n storage areas of a predetermined size. The storage areas of a predetermined size are called 'zones' (shown as 'Zone' in English in FIG. 2). A 'zone' as it is intended here is a constituent element of a stripe. A stripe has a plurality of data elements and a redundant data element computed based on the plurality of data elements written therein and one zone has one data element or one redundant data element written therein. The size of a zone is uniform for all of the physical disks 2100 and the size can be changed by control software that is executed by the host computer 300.

A data area 2200 is constituted by n−1 zones among N zones and a swap area 2300 is constituted by one zone. The data area 2200 is used as a write destination for user data elements and redundant data elements and the swap area 2300 is used as a temporary buffer area when the data elements are re-arranged.

Figure 3:
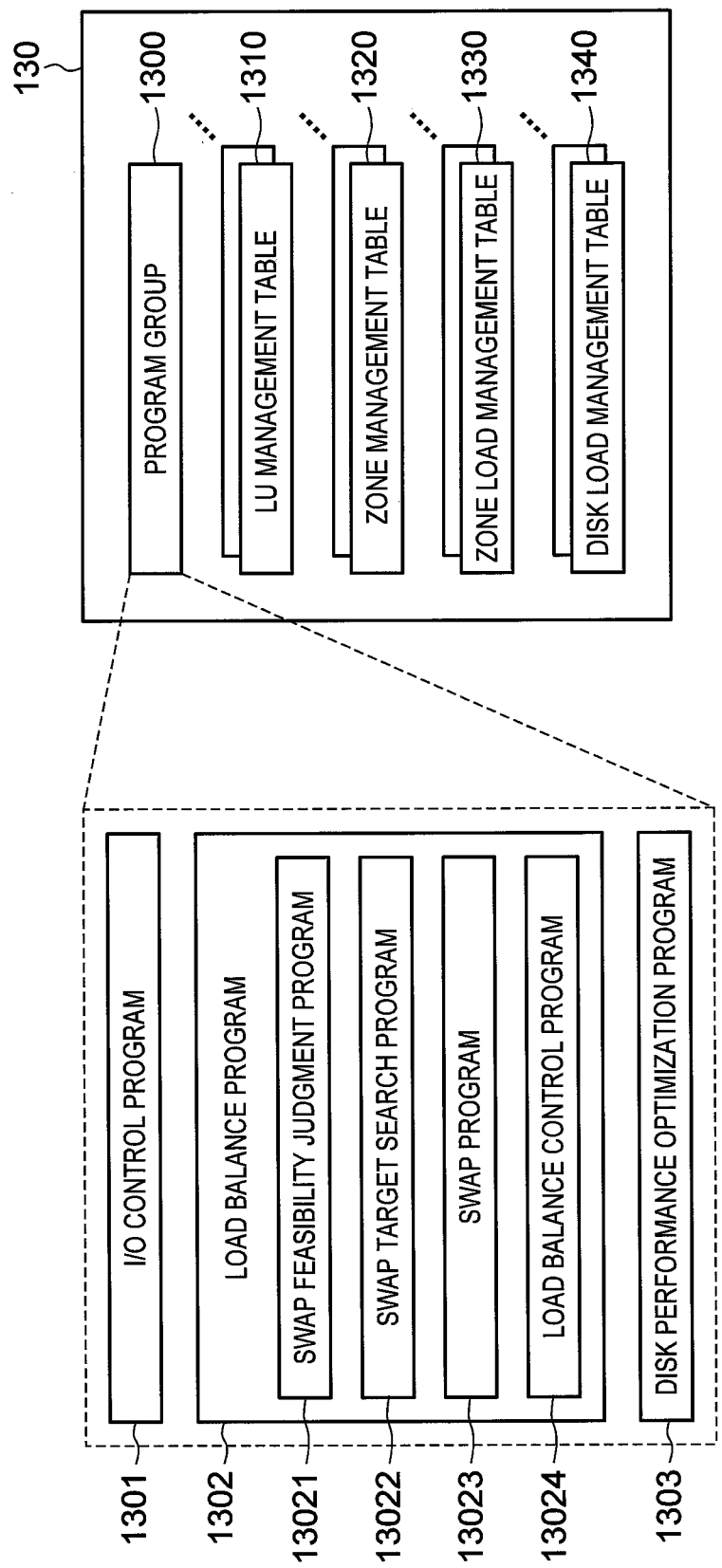
FIG. 3 shows computer programs and data that are stored in memory.

FIG. 3 shows a computer program and data stored in the memory 130.

The memory 130 stores a program group 1300 that is executed by the CPU 120, an LU management table 1310 that records information relating to the association between the logical address space of an LU 2400 and the physical address space of the physical disks 2100, a zone management table 1320 that records zone-related information, a zone load management table 1330 that records information relating to the load states of each zone, and a disk load management table 1340 that records information relating to the load states of the respective physical disks 2100.

Here, the LU management table 1310 is created for each LU 2400 and the zone management table 1320 and zone load management table 1330 are created for each physical disk 2100.

In addition, a program group 1300 includes, for example, an I/O control program 1301 that processes I/O commands received from the host computer 300 and updates the various load management tables 1330 and 1340, a load distribution program 1302 that distributes the load between the physical disks, and a disk performance optimization program 1303 that optimizes the performance of the physical disks 2100. The load distribution program 1302 has a swap feasibility judgment program 13021 that judges the feasibility of a data element swap, a swap target search program 13022 that searches for swap targets, a swap program 13023 that performs data element swaps, and a load distribution control program 13024 that controls the execution of load distribution processing. In cases where the computer program is the subject hereinbelow, the processing is executed by the CPU 120 that actually executes the computer program.

FIG. 4 shows a constitutional example of the LU management table 1310.

The LU management table 1310 has a column 1311 in which a stripe number is written, a column 1312 in which the RAID level is written, a column 1313 in which information relating to the logical address space is written, and a column 1314 in which information relating to the physical address space is written. Column 1313 has a column 13131 in which the start LBA (Logical Block Address) of the logical address space is written and a column 13132 in which the end LBA is written. Column 1314 has a column 1315 in which information representing the physical position of the storage area in which a user data element exists is written, a column 1316 in which information representing the position of the physical storage area in which a redundant data element 1 exists is written, and a column 1317 in which information representing the position of the physical storage area in which a redundant data element 2 exists is written. The columns 1315, 1316, and 1317 each have columns 13151, 13161, and 13171 respectively in which the HDD number is written, and columns 13152, 13162, and 13172 in which zone numbers are written. The LU management table 1310 records one record for each stripe of each single LU. One record is constituted by the number of the stripe, the RAID level of the RAID group having the LU, information relating to the logical address spaces corresponding to each stripe (leading LBA and end LBA), the HDD number and zone number in which a user data element exists, an HDD number and zone number in which redundant data 1 exists, and the HDD number and zone number in which redundant data 2 exists. It can be seen from this record which logical address space and physical address space are associated with which stripe and by which zone of which physical disk 2100 the corresponding physical address space is constituted.

Further, 'redundant data element 1' is a redundant data element that is created in cases where the redundancy is 1, for example. More specifically, for example, redundant data element 1 is a copy of the original user data element created in cases where the RAID level is RAID1 (mirrored user data element), a parity data element that is created in cases where the RAID level is RAID5 or one of the two redundant data elements created in cases where the RAID level is RAID6. 'Redundant data element 2' is a redundant data element that is created in cases where the redundancy is 2, for example. More specifically, for example, the redundant data element 2 is the other of the two redundant data elements created in cases where the RAID level is RAID6. Hence, depending on the RAID level of the RAID group in which the LU 2400 corresponding to the table 1310 exists, an invalid value ("N/A", for example) is recorded as the HDD number and zone number corresponding to redundant data elements 1 and 2.

In addition, the HDD number recorded in table 1310 is expressed by a combination of two kinds of numbers, where the first of these two kinds of numbers is the number of the disk box 210 and the other of these two kinds of numbers is the number of the physical disk (HDD) 2100 in the disk box 210.

FIG. 5 shows a constitutional example of the zone management table 1320.

The zone management table 1320 has a column 1321 in which the zone number is written, a column 1322 in which the zone attribute is written, a column 1323 in which the LU number is written, a column 1324 in which information relating to the logical address space is written, a column 1325 in which information relating to the physical address space is written, and a column 1326 in which optimal position information is written. Column 1324 has a column 13241 in which the start LBA of the logical address space is written and a column 13242 in which the end LBA is written. Column 1325 has a column 13251 in which the start LBA of the physical address space is written and a column 13252 in which the end LBA is written. One record is recorded for each single zone. One record is constituted by the zone number, zone attribute, LU number, start LBA and end LBA of the logical address space, start LBA and end LBA of the physical address space, and optimal position information. It can be seen from one record which zones correspond to which logical address spaces and which physical address spaces.

Figure 17:
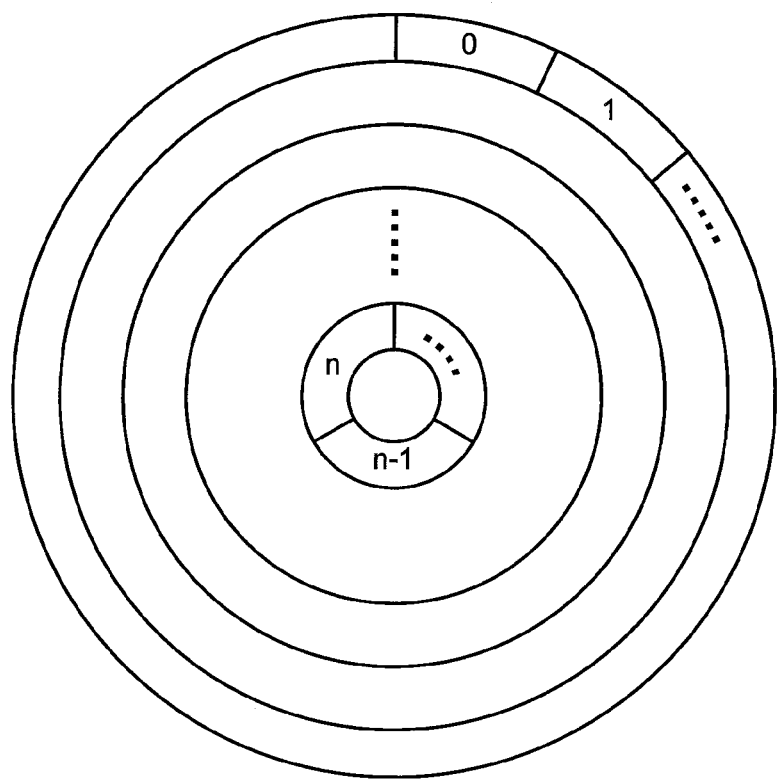
FIG. 17 shows the relationship between the respective areas and zone numbers of a disk medium of a physical disk.

In this embodiment, as exemplified in FIG. 17, the zones corresponding to the storage areas that exist on the outer periphery of the disk media of the physical disks 2100 have a small zone number allocated thereto and the zones that correspond to the storage areas that exist on the inner periphery of the disk media have large zone numbers allocated thereto.

In addition, the zone attribute represents the state of the zone and can be expressed by three parameters such as 'Data', 'swap' and 'N/A', for example. Here, 'Data' (shown as "D" in FIG. 5) represents a state where a user data element or redundant data element is stored in the zone; 'swap' (shown as "Swap" in FIG. 5) represents the fact that a zone is in a state of being used as a temporary buffer zone during re-arrangement of data elements, and 'N/A' represents the fact that the zone is an area for data element storage but is an unused space.

The optimal position information is information indicating which zone a data element stored in the zone is to be stored in and is, more specifically, the zone number of the zone constituting the transfer destination for the data element, for example.

FIG. 6 shows a constitutional example of the zone load management table 1330.

The zone load management table 1330 has a column 1331 in which the zone number is written, a column 1332 in which the number of commands is written, and a column 1333 in which the load ranking is written. The zone number, number of commands, and load ranking are written for each single zone.

Here, the number of commands is the access frequency with respect to the corresponding zone and is incremented each time the zone is accessed.

In addition, the load ranking indicates the order of the size of the load for each zone so that zones with higher zones have a lower number allocated thereto. More specifically, the zone with the highest load has the number "0" allocated thereto.

FIG. 7 shows a constitutional example of the disk load management table 1340.

The disk load management table 1340 has a column 1341 in which the HDD number is written and a column 1342 in which the load ratio is written. The HDD number and load ratio are recorded for each single physical disk 2100. The load ratio is calculated based on the IOPS (access frequency per second) of the physical disk 2100 and the number of command for each zone which is recorded in the zone load management table 1330 corresponding to the physical disk 2100, for example.

The content of the LU management table 1310, zone management table 1320, zone load management table 1330, and disk load management table 1340 can be confirmed by the user of the host computer 300 by utilizing control software that is executed by the host computer 300. In other words, the user is able to determine which logical address space of which LU is associated with which zone and obtain the load status and so forth in physical disk units and zone units or the like.

The processing that is executed in this embodiment will be described next.

Figure 8:
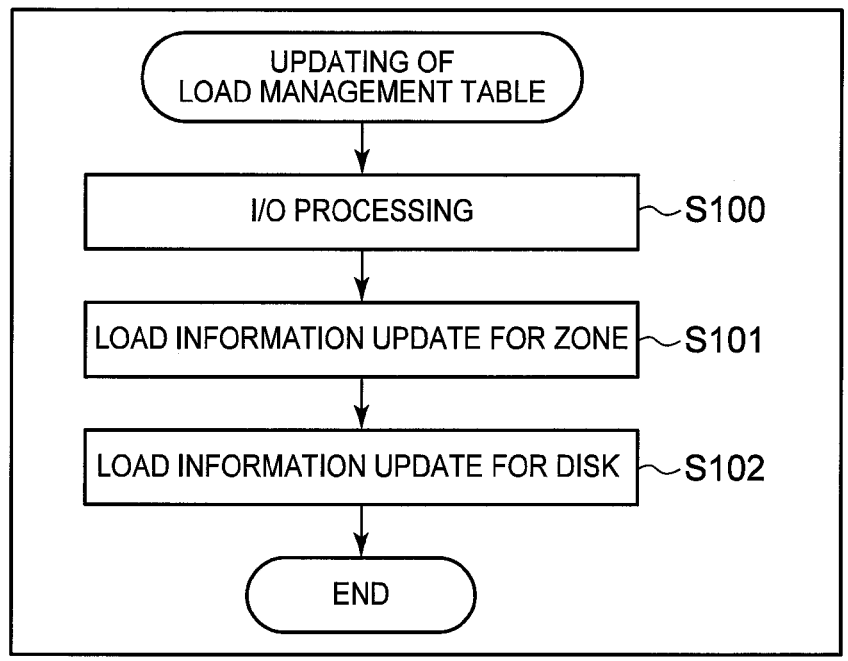
FIG. 8 shows an example of the flow of I/O command processing.

FIG. 8 shows an example of the flow of I/O command processing. The steps in FIG. 8 are abbreviated as 'S'.

The I/O control program 1301 executes I/O processing in response to the I/O command (read command or write command) that is received from the host computer 300 (step 100). More specifically, for example, the I/O control program 1301 specifies, based on the LU number and LBA designated by the I/O command, the physical address space that corresponds to the logical address space specified by the LU number and LBA and accesses the zone corresponding to the specified physical address space.

Thereafter, in accordance with the I/O processing in step 100, the I/O control program 1301 updates the number of commands and load ranking of the zone load management table 1330 that corresponds to the accessed zone (step 101).

In addition, the I/O control program 1301 calculates the load ratio of the physical disk 2100 holding the accessed zone based on the number of updated commands of the zone load management table 1330 and rewrites the calculated load ratio with the existing load ratio that corresponds to the physical disk 2100 (the load ratio recorded in the disk load management table 1340) (step 102).

As a result of the above I/O command processing, the zone load management table 1330 and disk load management table 1340 are updated each time the I/O processing is performed in response to the I/O command.

Figure 9:
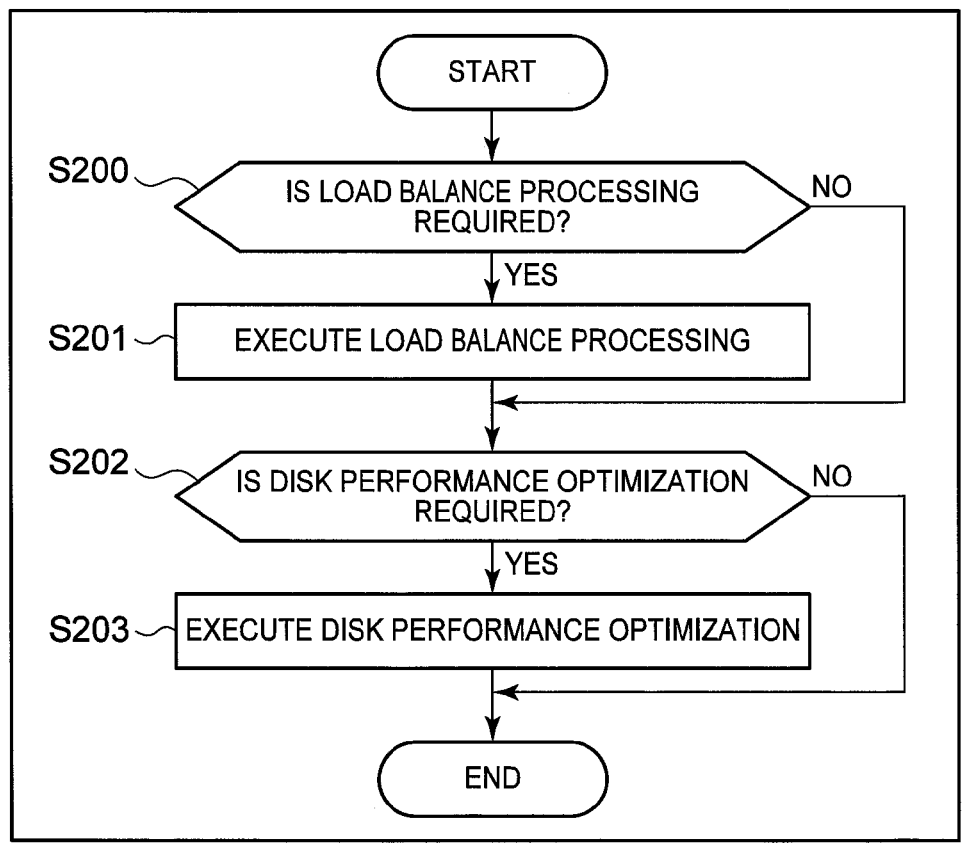
FIG. 9 shows an example of the flow of system performance optimization processing.

FIG. 9 shows an example of the flow of the system performance optimization processing.

The load distribution control program 13024 judges whether the load distribution processing is required (step 200). The load distribution control program 13024 references the disk load physical table 1340, for example, and, if there is a set of physical disks 2100 for which the difference in the load ratio is equal to or more than a predetermined value, judges that the load distribution processing is required. If there is no such set of physical disks 2100, the load distribution control program 13024 judges that the load distribution processing is not required.

In cases where it is judged that the load distribution processing is required (step 200: Yes), the load distribution control program 13024 executes load distribution processing (step 201) and, thereafter, causes the disk performance optimization program 1303 to execute step 202. However, in cases where the load distribution processing is not required (step 200: No), the load distribution control program 13024 skips step 201 and causes the disk performance optimization program 1303 to execute step 202.

The disk performance optimization program 1303 judges whether the disk performance optimization is required (step 202). More specifically, for example, for each physical disk 2100, the disk performance optimization program 1303 references the respective load ranking recorded in the zone load management table 1330 and judges whether the zones on the inner periphery of the physical disk 2100 have a higher load than the zones on the outer periphery thereof. In cases where it is judged that the zones on the inner periphery of the physical disk 2100 have a higher load than the zones on the outer periphery, disk performance optimization is required and, if not, disk performance optimization is not required.

In cases where it is ascertained that disk performance optimization is required (step 202: Yes), the disk performance optimization program 1303 executes disk performance optimization (step 203) and ends the system performance optimization processing. On the other hand, in cases where it is judged that disk performance optimization is not required, the disk performance optimization program 1303 ends the system performance optimization without further processing.

Here, system performance optimization processing is started by starting up the load distribution control program 13024 of the load distribution program 1302 at regular intervals, for example. As an example of regular timing, optional conditions can be adopted such as the execution at fixed times using a timer and the execution each time the number of commands received from the host computer 300 reaches a multiple of a specified number. In addition, examples of irregular timing, for example, include cases where the administrator of the storage system 10 uses control software that is installed on the host computer 300 to instruct the execution of this processing, cases where the storage system 10 receives a specified command, and cases where the CPU 120 executes a specified command.

Figure 10:
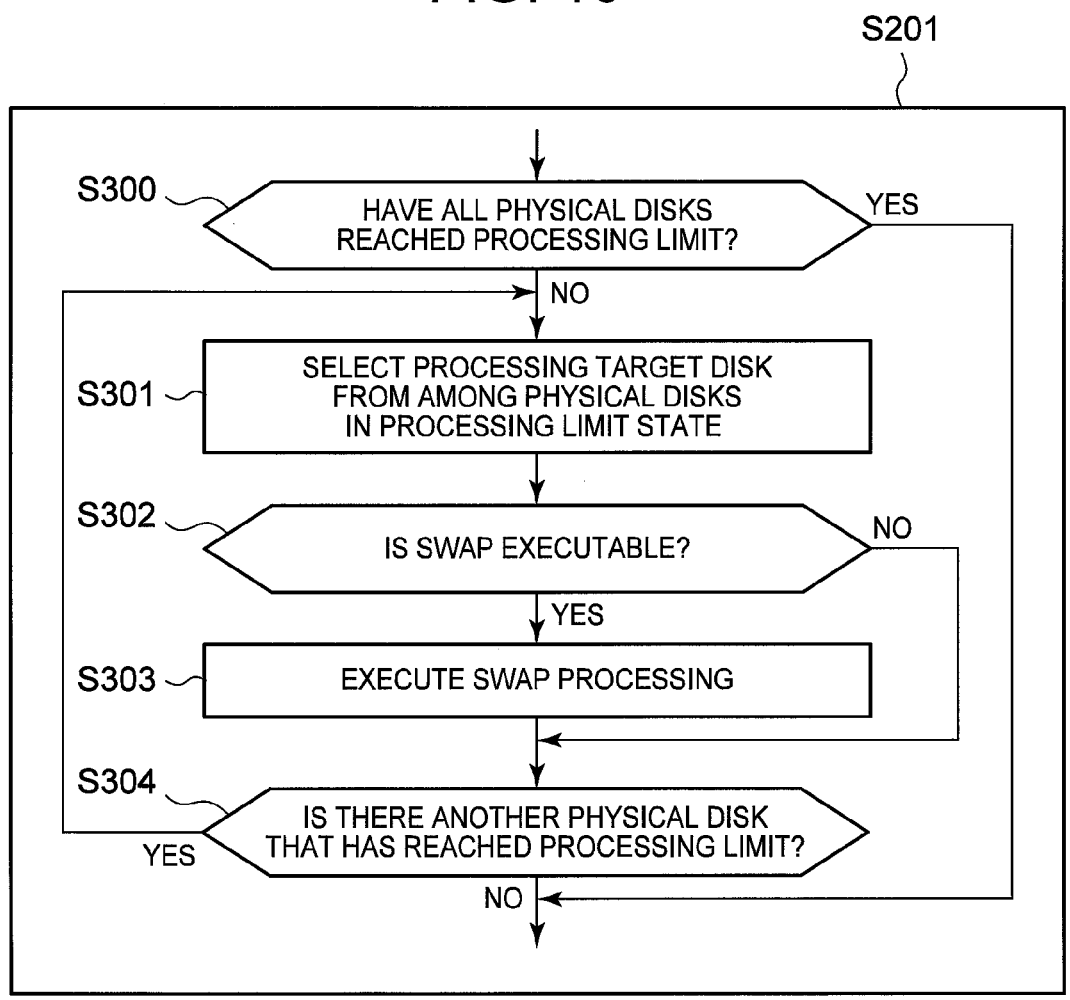
FIG. 10 shows an example of the flow of load distribution processing that is executed in step 201 in FIG. 9.

FIG. 10 shows an example of the flow of load distribution processing that is performed in step 201 of FIG. 9.

The load distribution control program 13024 references the disk load management table 1340 and judges whether all of the physical disks 2100 have reached a processing limit (step 300). In cases where at least one physical disk 2100 has not reached the processing limit (step 300: No), the load distribution control program 13024 selects one of the physical disks 2100 that have reached the processing limit as the processing target disk (step 301). However, in cases where all of the physical disks 2100 have reached the processing limit (step 300: Yes), the load distribution control program 13024 ends the load distribution processing. This is because it is difficult to avoid the processing limit state even when data elements are re-arranged between physical disks.

After step 301, the load distribution control program 13024 calls the swap feasibility judgment program 13021. The swap feasibility judgment program 13021 ascertains whether load distribution of the processing target disk is possible by means of the re-arrangement of data elements between the physical disks 2100 (whether a swap is possible) (step 302).

The load distribution control program 13024 moves to step 304 in cases where the result of ascertaining the swap feasibility is returned (step 302: No). However, in cases where the result of ascertaining the swap feasibility is returned (step 302: Yes), the load distribution control program 13024 calls the swap program 13023. The swap program 13023 executes a switch (that is, a swap) of data elements between the swap destination disk and processing target disk (step 303). Thereafter, the load distribution control program 13024 ascertains, based on the disk load management table 1340, whether there is a physical disk for which the processing limit has been reached in addition to the processing target disk (step 304). In cases where a physical disk 2100 for which the processing limit has been reached also exists, the load distribution control program 13024 returns to step 301 and, in cases where the physical disk 2100 for which the processing limit has been reached does not exist, the load distribution control program 13024 terminates the load distribution processing.

Figure 11:
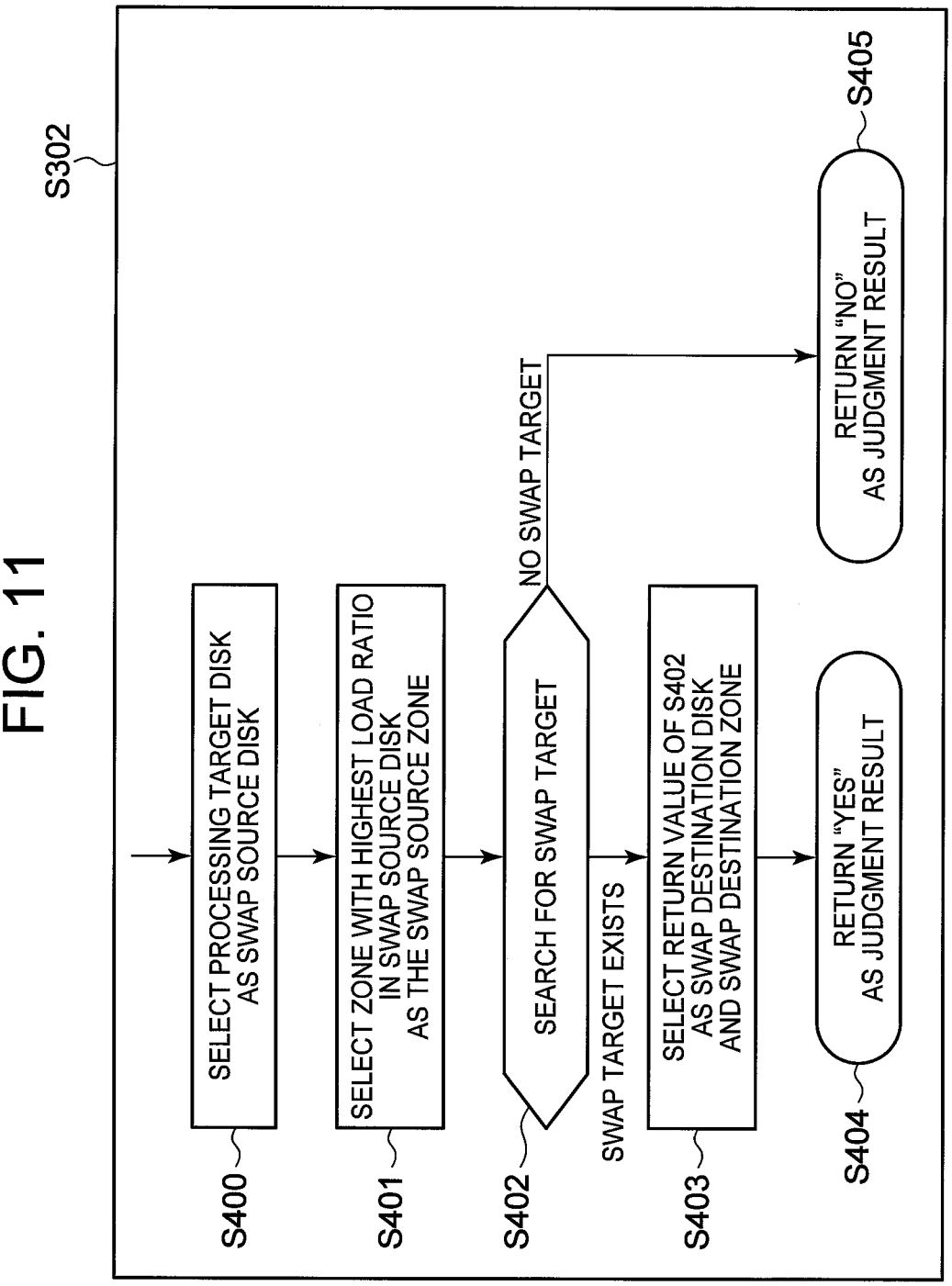
FIG. 11 shows an example of the flow of swap feasibility judgment processing that is executed in step 302 in FIG. 10.

FIG. 11 shows an example of the flow of swap feasibility judgment processing that is performed in step 302 in FIG. 10.

The swap feasibility judgment program 13021 selects the processing target disk that is selected in step 301 as the swap source disk (step 400) and, based on the zone load management table 1330 corresponding to the swap source disk, selects the zone with the maximum load ratio in the swap source disk as the swap source zone (step 401).

Thereafter, the swap feasibility judgment program 13021 calls the swap target search program 13022. The swap target search program 13022 searches the physical disk and zone constituting the swap target (step 402). In cases where it is judged in step 402 that there is a swap target, the swap feasibility judgment program 13021 selects the return values from the swap target search program 13022 of step 402 as the swap destination disk and swap destination zone respectively (step 403) and then returns a 'Yes', which indicates that a swap is possible, to the load distribution control program 13024 and ends step 302. However, in cases where it is judged in step 402 that there is no swap target, the swap feasibility judgment program 13021 returns a 'No', which indicates that a swap is impossible, to the load distribution control program 13024 and ends step 302.

Figure 12:
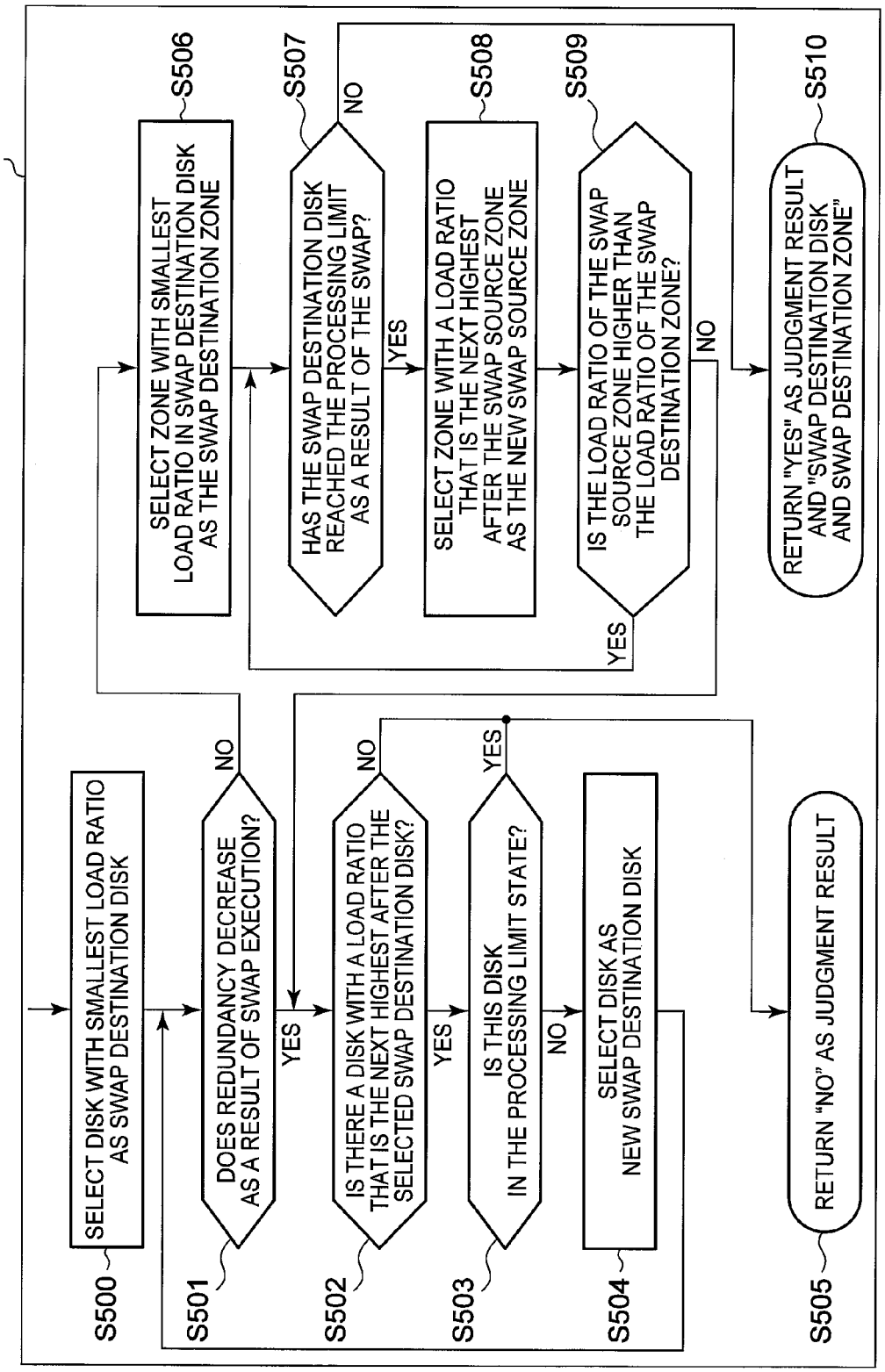
FIG. 12 shows an example of the flow of swap target search processing that is executed in step 402 in FIG. 11.

FIG. 12 shows an example of the flow of swap target search processing that is performed in step 402 of FIG. 11.

The swap target search program 13022 references the disk load management table 1340 and selects the physical disk with the lowest load ratio as the swap destination disk (step 500). The swap target search program 13022 checks whether the redundancy of the data stored in the swap source zone (zone selected in step 401) and swap destination zone as a result of executing the swap does not decrease (step 501). More specifically, for example, the swap target search program 13022 references the LU management table 1310 and ascertains whether data elements (user data element and redundant data element) that exist in the same stripe as the stripe in which the data elements stored in the swap source zone exist are not stored in the swap destination disk and whether data elements (user data element and redundant data element) that exist in the same stripe as the stripe in which the data elements stored in the swap destination zone exist are not stored in the swap source disk. More specifically, in cases where the LU management table 1310 has been updated by the swap, for example, it is ascertained whether the same HDD number does not then exist in one record of the LU management table 1310. It is said that redundancy decreases if the same HDD number exists.

Here, cases where the redundancy decreases include, for example, a case where two or more user data elements or redundant data elements (parity data elements) of the same stripe of the LU constituted by RAID5 exist on the same physical disk and cases where master data elements (original user data elements) and mirrored data elements (redundant data elements) of the same stripe of the LU constituted by RAID1 exist in the same physical disk and so forth. This is because, when a fault arises with the same physical disk, other data elements that exist in the same stripe can no longer be recovered.

In cases where it is ascertained that the redundancy decreases (step 501: Yes), the swap target search program 13022 ascertains whether the physical disk 2100 with the next highest load ratio of the physical disk 2100 currently selected as the swap destination disk exists (step 502). When such a physical disk 2100 exists (step 502: Yes), the swap target search program 13022 ascertains whether the physical disk has reached the processing limit based on the disk load management table 1340 (step 503). This is because load distribution cannot be performed even when a swap is executed (that is, a data element switch) in cases where the newly selected swap destination disk has reached the processing limit.

In cases where the currently selected physical disk has not reached the processing limit (step 503: No), the swap target search program 13022 selects the selected physical disk as the new swap destination disk (step 504) and returns to step 501.

However, in cases where there is no applicable physical disk in step 502 (step 502: No) and cases where the selected physical disk is in the processing limit state in step 503 (step 503: Yes), the swap target search program 13022 returns a 'No' which indicates that there is no swap target to the swap feasibility judgment program 13021 and ends step 402 (step 505).

In cases where it is judged in step 501 that the redundancy does not decrease (step 501: No), the swap target search program 13022 references the zone load management table 1330 corresponding to the selected swap destination disk and selects the zone with the lowest load ratio as the swap destination zone (step 506).

Thereafter, the swap target search program 13022 judges whether the swap destination disk has reached the processing limit as a result of the swap (step 507). The judgment of whether the swap destination disk has reached the processing limit is ascertained based on whether the number of commands after the swap (the number of commands of the swap destination zone is changed to the number of commands of the swap source zone and the changed number of commands and the number of commands of the other zones of the swap destination disk are totaled) exceeds the number of commands that can be processed of the swap destination disk.

In cases where it is ascertained that the swap destination disk has reached the processing limit in step 507 (step 507: Yes), the swap target search program 13022 selects the zone with the next highest load ratio of the selected swap source zone as the new swap source zone (step 508).

Thereafter, the swap target search program 13022 ascertains whether the load ratio of the swap source zone is higher than the load ratio of the swap destination zone (step 509).

In step 509, in cases where the load ratio of the swap source zone is higher than the load ratio of the swap destination zone (step 509: Yes), the swap target search program 13022 returns to step 507 and, in cases where the load ratio of the swap source zone is lower than the load ratio of the swap destination zone (step 509: No), the swap target search program 13022 returns to step 502 (that is, another search to do determine whether there is no physical disk that is appropriate as a swap destination disk is executed). This is because the load of the swap source disk is even higher as a result of the swap execution and swap execution is not preferable.

In cases where it is ascertained in step 507 that the swap destination disk has not reached the processing limit as a result of the swap (step 507: No), the swap target search program 13022 returns, in addition to a "Yes", which indicates that there is a swap target, the currently selected swap destination disk (the HDD number thereof, for example) together with the swap destination zone (the zone number thereof, for example) to the swap feasibility judgment program 13021 and ends step 402 (step 510).

Figure 13:
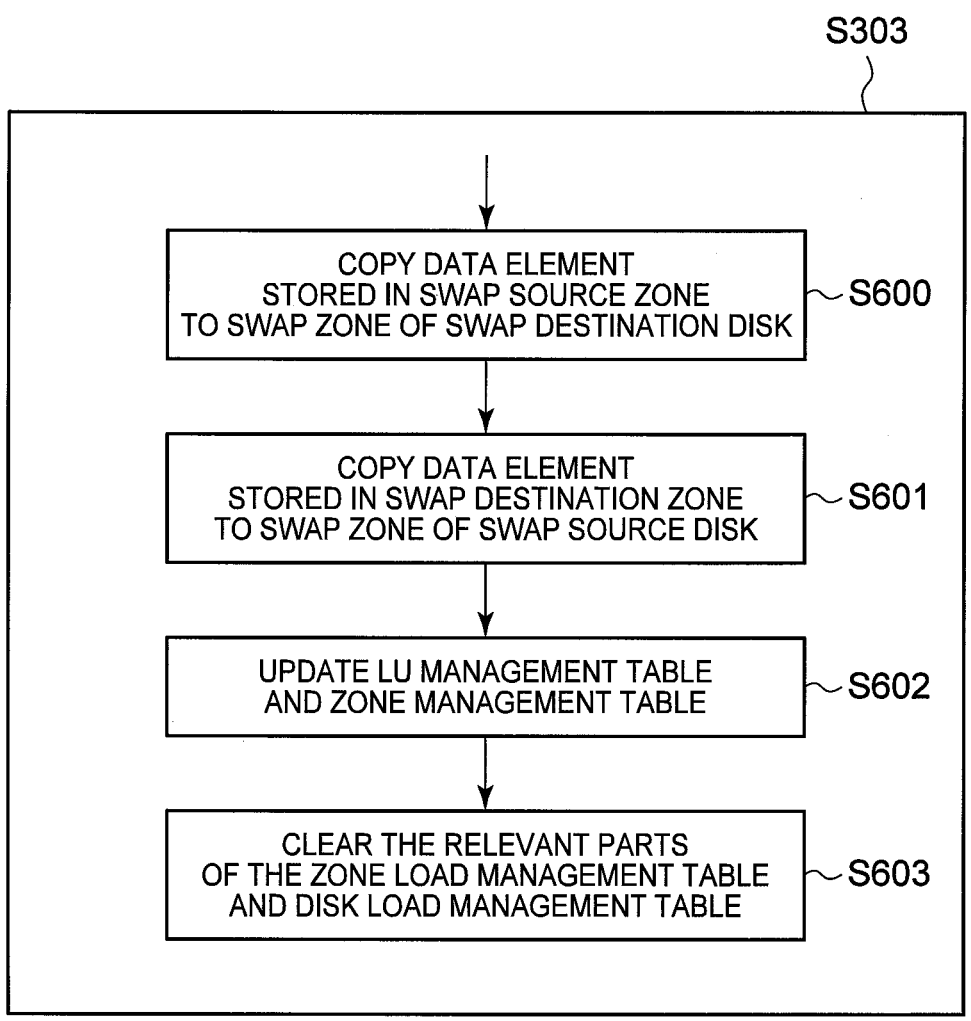
FIG. 13 shows an example of the flow of swap processing that is executed in step 303 of FIG. 10.

FIG. 13 shows an example of the flow of swap processing that is performed in step 303 of FIG. 10.

The swap program 13023 starts processing to copy data elements stored in the swap source zone to the swap zone on the swap destination disk (the zone constituting the swap area 2300) (step 600).

Thereafter, the swap program 13023 copies data elements stored in the swap destination zone to the swap zone on the swap source disk (step 601).

Subsequently, the swap program 13023 updates the LU management table 1310 and zone management table 1320. More specifically, for example, it can be said for the LU management table 1310 that the swap program 13023 changes the HDD number and zone number corresponding to the swap source zone into the HDD number and zone number corresponding to the swap zone (that is, copy destination zone) in the swap destination disk and, likewise, changes the HDD number and zone number corresponding to the swap destination zone to the HDD number and zone number corresponding to the swap zone (that is, the copy destination zone) on the swap source disk. Further, for example, it can be said for the zone management table 1320 that the swap program 13023 changes the zone attributes corresponding to the swap source zone and swap destination zone from Data to 'Swap' and changes the respective corresponding LU number and logical address space to 'N/A'. In addition, the swap program 13023 changes the zone attribute corresponding to the swap zone on the swap destination disk from 'Swap' to Data and changes the corresponding LU number and logical address space from 'N/A' to the LU number and logical address space corresponding to the swap source zone. In addition, the swap program 13023 changes the zone attribute corresponding to the swap zone on the swap source disk from 'Swap' to 'Data' and changes the corresponding LU number and logical address space from 'N/A' to the LU number and logical address space corresponding to the swap destination zone.

The swap program 13023 reset the number of commands and load ranking recorded in the zone load management table 1330 and the load ratio recorded in the disk load management table 1340 (all are returned to zero, for example) (step 605).

Figure 14:
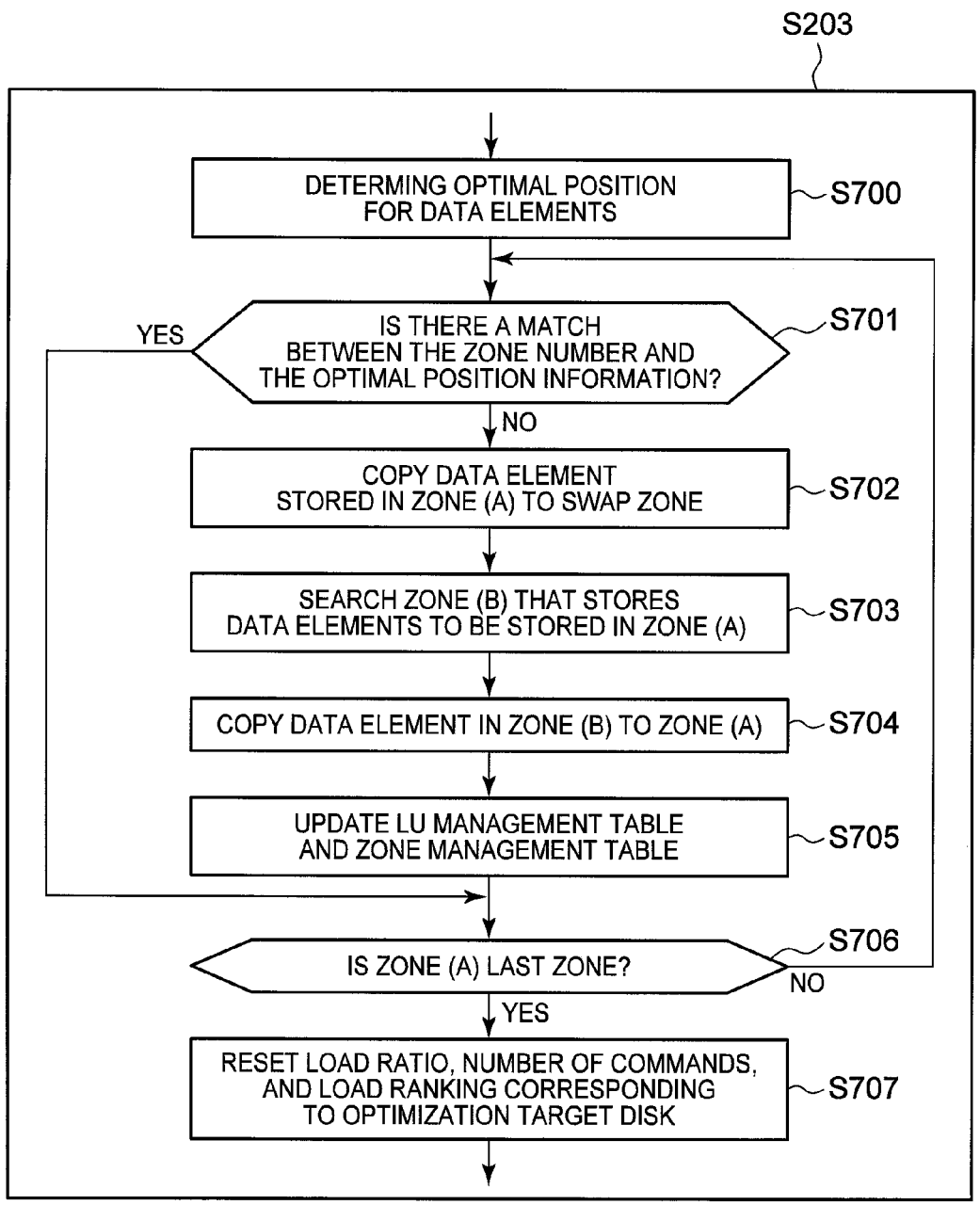
FIG. 14 shows an example of the flow of disk performance optimization processing that is executed in step 203 in FIG. 9.
Figure 15:
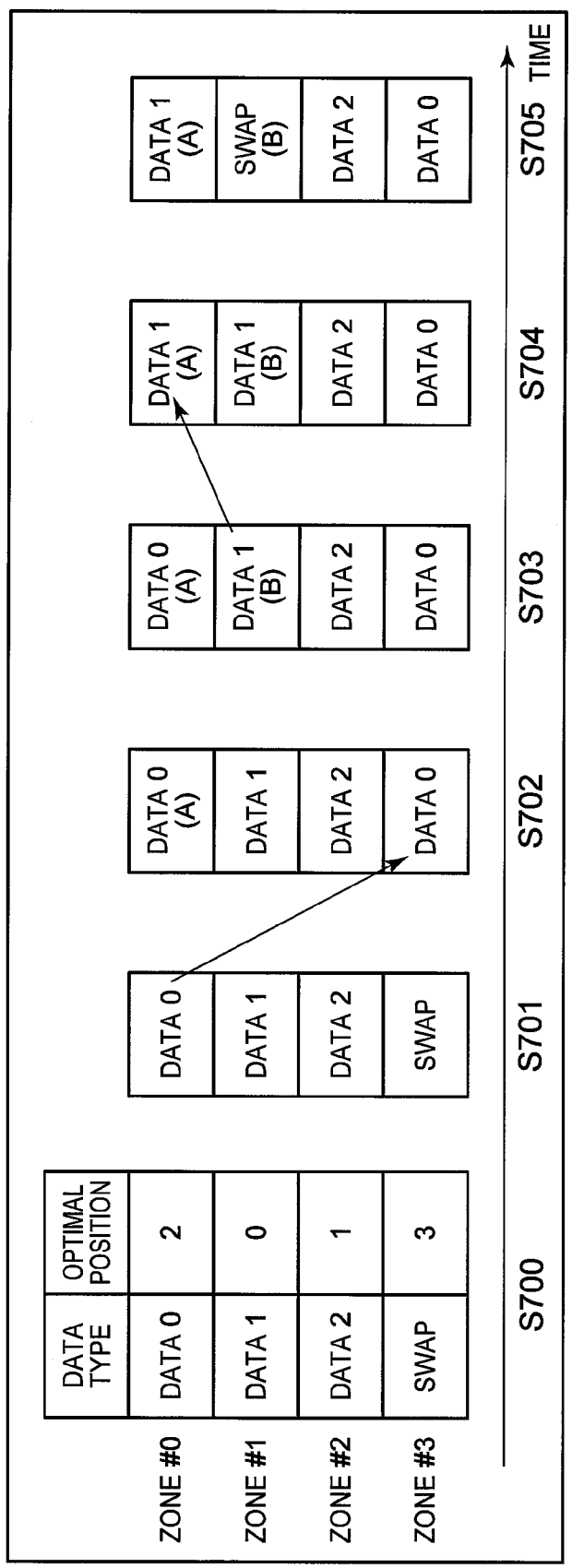
FIG. 15 is an explanatory diagram that provides an overview of the disk performance optimization processing.

FIG. 14 shows an example of the flow of disk performance optimization processing performed in step 203 of FIG. 9. A description thereof will be suitably provided with reference to FIG. 15. Further, steps 700 to 705 in FIG. 15 correspond to steps 700 to 705 of FIG. 14.

The disk performance optimization program 1303 determines the optimal positions for data elements on a physical disk for which zone switching is required (a physical disk for which the zones at the inner periphery thereof have a higher load than zones at the outer periphery thereof, referred to hereinbelow as the 'optimization target disk') (step 700). More specifically, the disk performance optimization program 1303 references the zone load management table 1330 corresponding to the optimization target disk and copies the load ranking recorded in column 1333 of the table 1330 to column 1326 of the zone management table 1320 corresponding to the optimization target disk. The zone management table 1320 and zone load management table 1330 both have a plurality of records constituting the table (one data item corresponding to one zone) arranged in number order based on the zone number (in ascending order, for example). Further, the zone number and load ranking are both integers for which 0 is the minimum value. Hence, in the zone management table 1320, the copied load ranking is optimal position information and represents the number of the transfer destination zone.

Steps 701 to 706 hereinbelow are executed for each zone of the optimization target disk.

The disk performance optimization program 1303 judges whether the zone number and optimal position information match (step 701).

In cases where a match is detected in step 701 (step 701: Yes), because the zone corresponding to the zone number is the optimum storage position, the disk performance optimization program 1303 does not perform steps 702 to 705 and executes step 706.

However, in cases where a mismatch is detected in step 701 (step 701: No), the disk performance optimization program 1303 copies data element "0" that is stored in the current processing target zone (in a zone for which the zone number is "x" (where x is an integer) that is called 'zone (A)' hereinbelow) to the swap zone in the optimization target disk (step 702).

Thereafter, the disk performance optimization program 1303 searches the zone storing the data elements that are to be stored in zone (A) (called 'zone (B)' hereinbelow), in other words, the zone for which the same value as the zone number of zone (A) is the optimal position information (step 703). It may be said for the example in FIG. 15 that, in cases where the zone number of zone (A) is "0", the zone number of zone (B) is "1". That is, zone 0 (the zone with zone number "0") is zone (A) and zone 1 is zone (B) while zone 3 is the swap zone.

After the copying of step 702 has ended, the disk performance optimization program 1303 copies data element "1" stored in zone (B) to zone (A) (step 704). As a result, data element "0" stored in zone (A) is overwritten with data element "1".

After the copying of step 704 has ended, the disk performance optimization program 1303 updates the LU management table 1310 and zone management table 1320 (step 705). More specifically, for example, the disk performance optimization program 1303 associates the LU number and logical address space corresponding to zone 0 with zone 3, associates the LU number and logical address space corresponding to zone 1 with zone 0, and associates the LU number and logical address space corresponding to zone 3 (here, zone 3 is the swap zone and, therefore, the LU number and logical address space are each 'N/A') with zone 1.

Thereafter, the disk performance optimization program 1303 ascertains whether the current processing target zone is the last zone (the zone with the zone number "N", for example) (step 706). When the current processing target zone is not the last zone, the disk performance optimization program 1303 makes the next zone (the zone with the zone number "x+1", for example) the processing target zone and executes the processing from steps 701 to 705. However, in cases where the current processing target zone is the last zone, the disk performance optimization program 1303 resets the load ratio, number of commands, and load position corresponding to the optimization target disk (step 707) and ends step 203. Subsequently, if an optimization target disk still remains, step 203 is executed for the other optimization target disk.

According to the embodiment hereinabove, by performing a swap to make uniform the load between the physical disks 2100 and a swap to maximize the performance of a single physical disk while maintaining the RAID redundancy, a maximized performance can be expected for the storage system 10.

Although the preferred embodiments of the present invention were described hereinabove, these embodiments are examples serving to describe the present invention, there being no intention to limit the scope of the present invention to these embodiments alone. The present invention can also be implemented in a variety of other forms.

Figure 18:
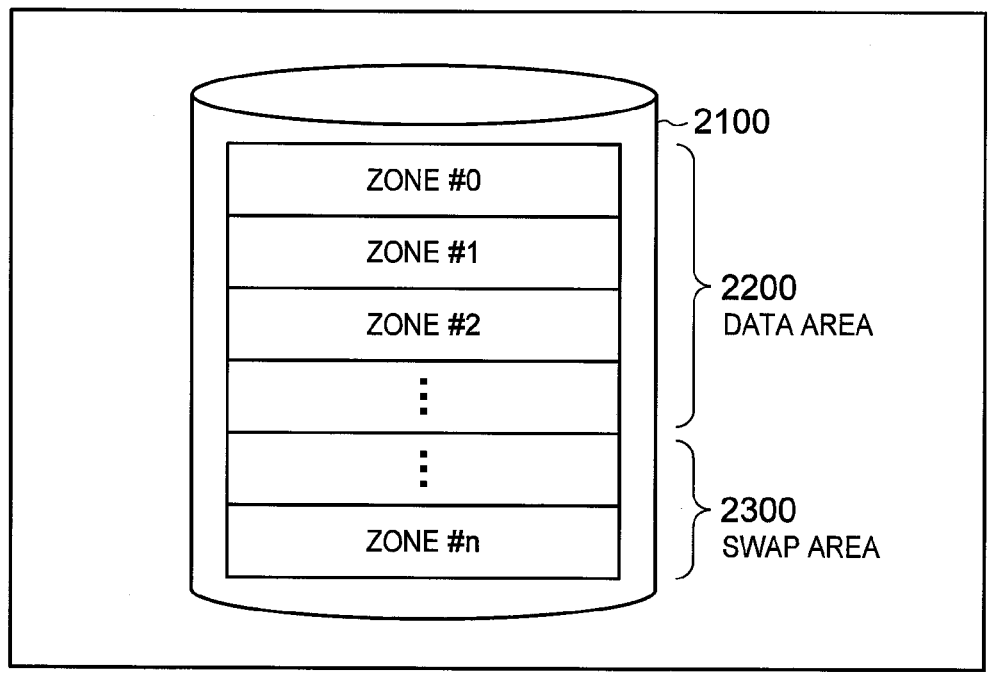
FIG. 18 shows a modified example of the constitution of the storage space provided by the physical disk.

For example, as exemplified in FIG. 18, the number of zones constituting swap area 2300 in one physical disk 2100 may also be two or more. In this case, two or more swap zones may be used in parallel in the disk performance optimization processing. In other words, instead of step 203 being performed for one processing target zone, two or more processing target zones may be selected and step 203 may be performed for two or more processing target zones. As a result, the time interval of the disk optimization processing of one physical disk 2100 can be shortened.

In addition, information such as the number of commands and the load ratio, for example, may be updated not only in the event of processing in accordance with I/O commands from the host computer 300 but also in cases where access to the physical disk 2100 occurs for another reason. For example, an update may also be made in cases where access for the replication or transfer of data between LU takes place.

What is claimed is:

1. A storage system, comprising:
    a plurality of flash memory devices; and
    a controller configuring a plurality of logical volumes formed based on a storage area group that constitutes a storage space of the plurality of flash memory devices,
    wherein the controller performs access, based on a RAID (Redundant Array of Independent (or Inexpensive) Disks) level corresponding to a logical volume, to each storage area of each of two or more flash memory devices that constitute the logical volume,
    wherein the controller calculates a load of each of the flash memory devices based on a load that accompanies the access to each storage area,
    wherein the controller determines whether a difference of any of two loads among the calculated load of each of the flash memory devices is above a predetermined value,
    wherein when it is determined that the difference of any of two loads is above a predetermined value, the controller executes load distribution processing to distribute the loads of the plurality of flash memory devices,
    wherein, in the load distribution processing, the controller selects a high load flash memory device and selects a high load first storage area from two or more storage areas of the selected high load flash memory device, selects a flash memory device with a lower load than the load of the selected high load flash memory device, selects a low load second storage area from two or more storage areas of the selected low load flash memory device,
    wherein the controller makes a determination of whether the redundancy according to the RAID level decreases when data elements stored in the first storage area are transferred to the selected low load flash memory device,
    wherein when a result of the determination is that the redundancy does not decrease, the controller executes replacement processing between the data elements stored in the first storage area and data elements stored in the second storage area,
    wherein when a result of the determination is that the redundancy decreases, the controller selects another flash memory device which has a lower load than the load of the selected high load flash memory device, and has a higher load than the load of the selected low load flash memory device, and
    wherein the controller levels loads of the plurality of flash memory devices by executing the load distribution processing more than once.

2. The storage system according to claim 1, further comprising:
    volume management information representing which storage area of which flash memory device each of the plurality of data elements written to volume element areas constituting the logical volume is written to,
    wherein the determination of whether the redundancy decreases is a determination that is performed by referencing the volume management information and is a determination of whether the flash memory device having the selected storage area is the selected low load flash memory device, for the same volume element area.

3. The storage system according to claim 1,
    wherein in the replacement process, the controller transfers the data elements stored in the first storage area to a buffer area of the selected low load flash memory device, which is a storage area used as a buffer that does not correspond to a logical address space of the logical volume, and associates the logical address space of the logical volume that corresponds to the first storage area with the buffer area, and
    wherein after data elements have been transferred from the first storage area, the first storage area is established as the buffer area.

4. The storage system according to claim 1, wherein when the selected high load flash memory device is a flash memory device with the Kth (K is an integer) highest load among the plurality of flash memory devices, the low load flash memory device that is selected is the flash memory device with the Kth lowest load among the plurality of flash memory devices.

5. The storage system according to claim 1, wherein the controller also determines, based on the load of the first storage area, whether the load of the selected low load flash memory device exceeds a predetermined value when the data elements are transferred, and if the load exceeds the predetermined value, selects another storage area with a lower load than the load of the first storage area, from the two or more storage areas of the selected high load flash memory device.

6. The storage system according to claim 3, wherein the controller transfers data elements that are stored in the second storage area of the selected low load flash memory device to the buffer area of the selected high load flash memory device.

7. The storage system according to claim 1, wherein the controller determines whether the load of a second storage is area higher than the load of a first storage area, and if the former is higher than the latter, selects a flash memory device which has a lower load than the load of the selected high load flash memory device and which is other than the selected low load flash memory device.

8. The storage system according to claim 1,
    wherein the controller further executes storage device optimization processing for a certain flash memory device among the plurality of flash memory devices, and
    wherein, in the storage device optimization processing, for the certain flash memory device, data elements stored in a third storage area with high-speed access and a low load are copied to a buffer area of the certain flash memory device, and data elements stored in a fourth storage area with lower speed access than the third storage area and with a high load are copied to the third storage area, and the logical address space associated with the fourth storage area is associated with the third storage area.

9. The storage system according to claim 8, wherein the storage device optimization processing is executed after the load distribution processing.

10. The storage system according to claim 8, wherein, in the storage device optimization processing, data elements stored in the fourth storage area are also copied to the third storage area, whereupon the fourth storage area is established as a buffer area.

11. The storage system according to claim 8,
wherein the controller further determines whether the dispersion extent of the load of the plurality of flash memory devices is equal to or less than a predetermined extent, and
wherein, when it is determined that the dispersion extent of the load is equal to or less than the predetermined extent, the storage device optimization processing is performed without performing the load distribution processing.

12. The storage system according to claim 8, wherein the certain flash memory device has two or more buffer areas, and the controller performs storage device optimization processing by using the two or more buffer areas in parallel for two or more third storage devices of the certain flash memory device.

13. The storage system according to claim 8, wherein respective storage area identifies of two or more storage areas of the certain flash memory device are serial numbers, and wherein when the load rankings of the respective storage areas are set as storage area identifiers, the copy destination of the data elements stored in the respective storage areas is a storage area that is identified from the storage area identifiers.

14. A leveling method for leveling loads of each flash memory device in a storage system, the storage system comprising a plurality of flash memory devices, and the method comprising the steps of:
accessing, based on a RAID (Redundant Array of Independent (or Inexpensive) Disks) level corresponding to a logical volume, to each storage area of each of two or more flash memory devices that constitute the logical volume;
calculating a load of each of the flash memory devices based on a load that accompanies the access to each storage area;
determining whether a difference of any of two loads among the calculated load of each of the flash memory devices is above a predetermined value;
when it is determined that the difference of any of two loads is above a predetermined value, executing load distribution processing to distribute the loads of the plurality of flash memory devices;
in the load distribution processing, selecting a high load flash memory device and selecting a high load first storage area from two or more storage areas of the selected high load flash memory device;
selecting a flash memory device with a lower load than the load of the selected high load flash memory device and selecting a low load second storage area from two or more storage areas of the selected low load flash memory device;
making a determination of whether the redundancy according to the RAID level decreases when data elements stored in the first storage area are transferred to the selected low load flash memory device;
when a result of the determination is that the redundancy does not decrease; executing replacement processing between the data elements stored in the first storage area and data elements stored in the second storage area;
when a result of the determination is that the redundancy decreases, selecting another flash memory device which has a lower load than the load of the selected high load flash memory device, and has a higher load than the load of the selected low load flash memory device; and
leveling loads of the plurality of flash memory devices by executing the load distribution processing more than once.

15. The leveling method according to claim 14, further comprising the steps of:
configuring a plurality of logical volumes formed based on a storage area group that constitutes a storage space of the plurality of flash memory devices; and
generating volume management information representing which storage area of which flash memory device each of the plurality of data elements written to volume element areas constituting the logical volume is written to,
wherein the determination of whether the redundancy decreases is a determination that is performed by referencing the volume management information and is a determination of whether the flash memory device having the selected storage area is the selected low load flash memory device, for the same volume element area.

16. The leveling method according to claim 14, further comprising the steps of:
configuring a plurality of logical volumes formed based on a storage area group that constitutes a storage space of the plurality of flash memory devices; and
in the replacement process, transferring the data elements stored in the first storage area to a buffer area of the selected low load flash memory device, which is a storage area used as a buffer that does not correspond to a logical address space of the logical volume, and associating the logical address space of the logical volume that corresponds to the first storage area with the buffer area,
wherein after data elements have been transferred from the first storage area, the first storage area is established as the buffer area.

17. The leveling method according to claim 14, wherein when the selected high load flash memory device is a flash memory device with the Kth (K is an integer) highest load among the plurality of flash memory devices, the low load flash memory device that is selected is the flash memory device with the Kth lowest load among the plurality of flash memory devices.

18. The leveling method according to claim 14, further comprising the steps of:
determining, based on the load of the first storage area, whether the load of the selected low load flash memory device exceeds a predetermined value when the data elements are transferred, and if the load exceeds the predetermined value; and
selecting another storage area with a lower load than the load of the first storage area, from the two or more storage areas of the selected high load flash memory device.

19. The leveling method according to claim 14, further comprising the steps of:
transferring data elements that are stored in the second storage area of the selected low load flash memory device to the buffer area of the selected high load flash memory device.

20. The leveling method according to claim 14, further comprising the steps of:
determining whether the load of a second storage area is higher than the load of a first storage area; and
if the former is higher than the latter, selecting a flash memory device which has a lower load than the load of the selected high load flash memory device and which is other than the selected low load flash memory device.

* * * * *